(No Model.) 2 Sheets—Sheet 1.
C. SORLEY.
SECONDARY BATTERY ELEMENT.
No. 353,511. Patented Nov. 30, 1886.
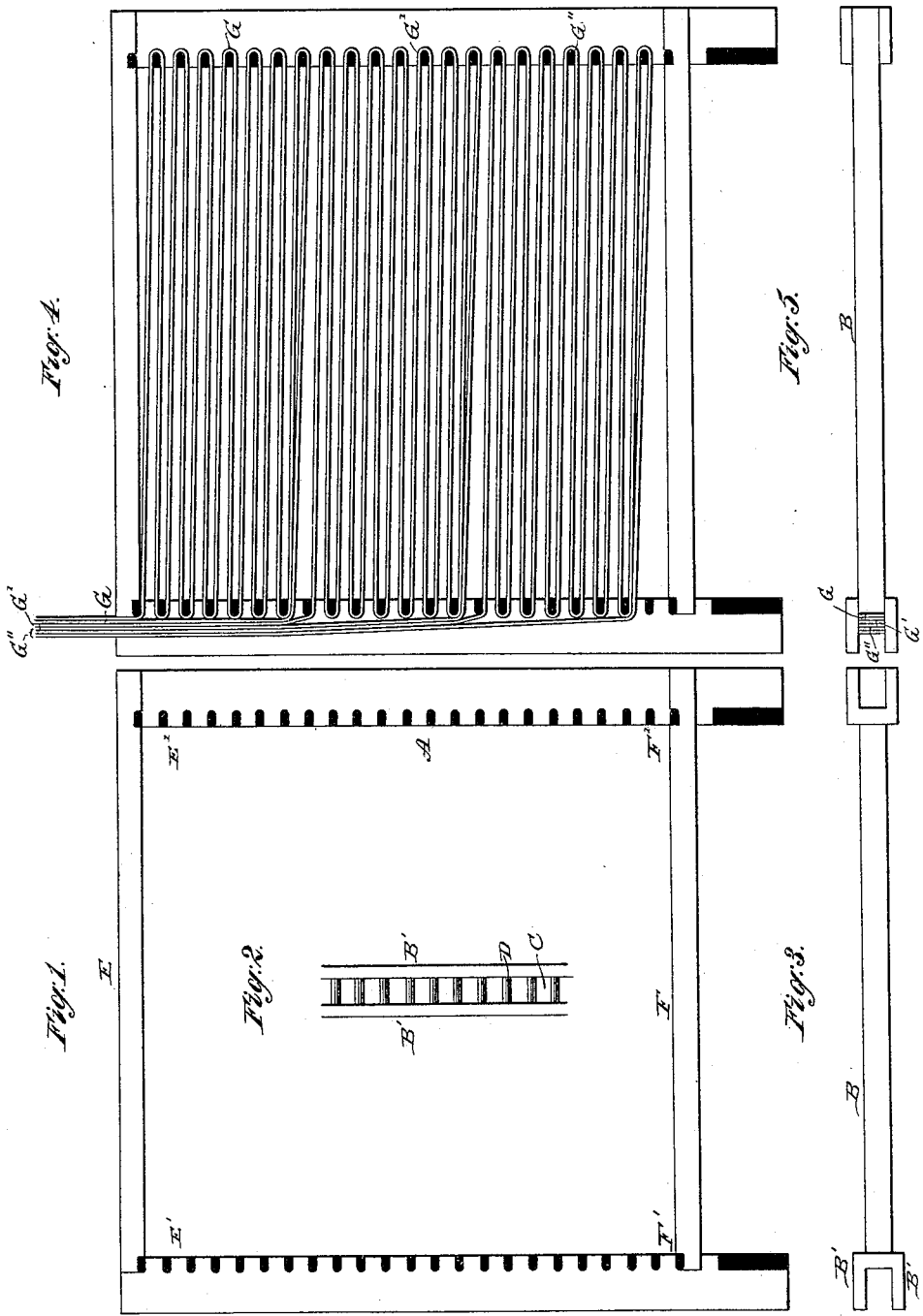
Witnesses:
E. C. Perkins.
A. E. Sexton.
Inventor:
Charles Sorley.
Geo. H. Benjamin
By his Attorney.

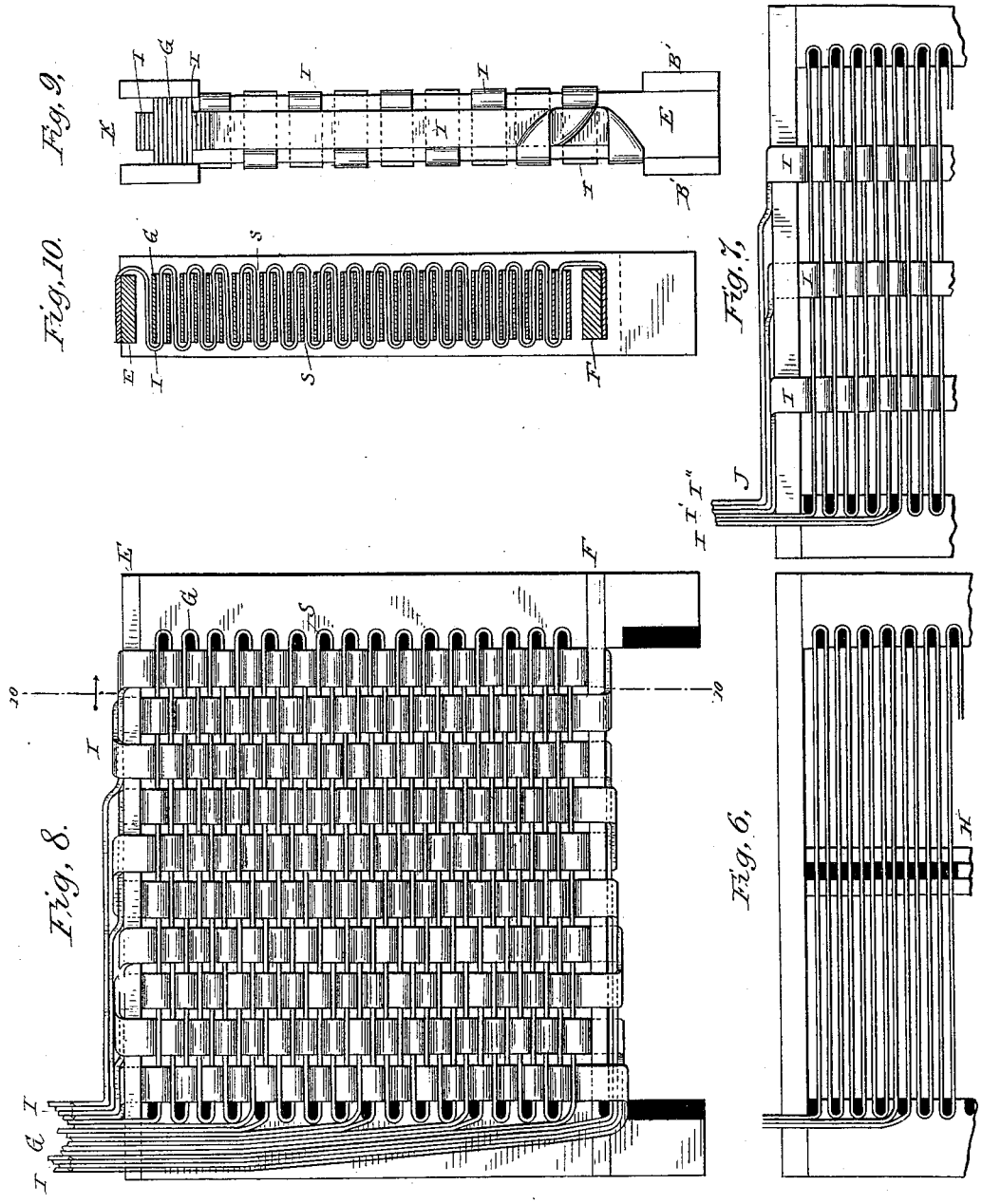

UNITED STATES PATENT OFFICE.

CHARLES SORLEY, OF NEW YORK, N. Y.

SECONDARY-BATTERY ELEMENT.

SPECIFICATION forming part of Letters Patent No. 353,511, dated November 30, 1886.

Application filed February 25, 1886. Serial No. 193,261. (No model.)

*To all whom it may concern:*

Be it known that I, CHARLES SORLEY, a subject of the Queen of Great Britain, and a resident of the city, county, and State of New York, have invented certain new and useful Improvements in Secondary-Battery Elements; and I do hereby declare that the following is a full, clear, and exact description of the invention, such as will enable others skilled in the art to which it pertains to make and use the same.

My invention relates to elements or electrodes such as are used or employed in secondary or storage batteries; and it consists in forming the body, plate, or support of an element in such a manner that they will present a large extent of surface for the application of the active material, and be of such form or configuration as to retain the material in its proper position and in contact with the surface of the plate during the exigencies of actual practice.

My invention also consists in so forming the elements or electrodes that they will be strong and cohesive, and will not buckle or bend or be liable to disintegration during the operation of the battery within which they are employed.

It also relates to the method employed for connecting the different portions or parts of an electrode with the terminal.

It has been found in practice that where the body or support of a battery element is formed from a single strip of metal bent, twisted, woven, or otherwise arranged to form a plate, and the ends of the strip carried to a terminal, cast or otherwise formed, that portions of the plate are apt to become insulated from the terminal, owing either to a disintegration of the metal strip or by reason of a layer of sulphate of lead forming on the surface of the strip and between the strip and the active material which it supports.

In order to overcome the objections stated, I have devised the element or electrode which I will now proceed to describe.

The subject-matter herein claimed is particularly pointed out at the close of the specification.

In the accompanying drawings, which illustrate my invention, similar letters of reference indicate like parts.

Figure 1 is a front view of an insulating support or frame on which I arrange the strips of lead or other material which form the body of the plate or element, the side supports shown in vertical section. Fig. 2 is a side elevation of one of the side supports and shows the rungs over which the horizontally-arranged metal strips are applied. Fig. 3 is an inverted plan of Fig. 1. Fig. 4 is also a front view of Fig. 1, and shows the strips of lead wound over the rungs of the side supports and the ends of the separate strips or windings carried upward along one side of the frame to form the terminal. Fig. 5 is a plan view of Fig. 4. Fig. 6 represents a modification of Fig. 4, and shows in vertical section a supporting-piece arranged in the center of the frame between the lead strips. Fig. 7 is also a modification of Fig. 4, and shows strips of lead arranged vertically and braided or woven through the horizontal strips. Fig. 8 represents a further modification of Fig. 4, with vertically-arranged strips of lead wound in and out or turned over the horizontally-arranged strips and covering the entire surface of the plate. The view also shows the manner of connecting the ends of all the strips to form the terminals. Fig. 9 is a plan view of Fig. 8. Fig. 10 is a vertical section of the body of the plate or element, taken through the line 10 10 of Fig. 8.

In the drawings, A A represent the side supports, which may be formed of hard rubber or other insulating material which will not disintegrate by use. The side supports consist of a web, B, Fig. 3, and two side flanges, B'. Through the web B, I form the openings C, and provide the rungs D, over which the lead strips can be applied.

E represents the top piece of the frame, and is provided with a notch at each end, E', to fit over the top rungs of the side supports.

F is the bottom piece, also provided with notches F', which fit under the bottom rungs of the side supports.

The form of frame described is the one I have found most convenient for use. I do not limit myself, however, to any particular shape or design of supporting-frame.

Upon the frame formed as described, or upon any other suitably-arranged frame, I wind strips of lead, or lead and an alloy of lead, or lead mixed with any active or non-active material, and which may have any desired width. Commencing, as at G, at the upper left-hand corner of the frame, I carry the strip under the first rung, then across the frame to the second rung, and so on down the frame until about one-third of its surface is covered. The end of the strip is then carried upward on the left-hand side of the frame and arranged parallel with the other end of the same strip. Starting at G', a second strip is carried downward under the eighth rung, across the frame, and so on down, and until another third of the surface of the plate is covered, the end being carried upward and arranged parallel with its other end and the ends of the strip G. A third strip, G'', is carried downward and over the last third of the surface of the plate, and then upward and along the side of the other strips. The ends of the strips G, G', and G'' when united together form the terminal. The object of arranging the strips in the manner described is to provide a more efficient means of collecting and conveying away the current generated upon the plate, or to convey the external current to the element in charging.

It is a matter of frequent occurrence in storage-batteries that a portion of the plate or element will become short-circuited, owing to a separation between a portion of the plate and the terminal. Where a plate or support is formed from a single strip and that strip becomes corroded, melted, or broken in any manner, a large portion of the plate is rendered useless. Again, where very narrow strips of lead are used, the conductivity of the strip—that is, its capacity for conveying a current to or from the element in charging or discharging—is very limited, and, as a consequence, the efficiency of an element so formed is not great; whereas, where the body of the element is formed in sections, (and any convenient number may be employed,) the conductivity is increased in proportion to the number of separate strips employed, and the capacity for rapid charging becomes very much greater, and it can be discharged without giving rise to any dangerous amount of heat.

In the drawings, Fig. 6, I have shown at H a support of insulating material, its object being to support the horizontal strips of lead and prevent their sagging. In place of using the support H, and also to increase the conducting-surface of the body of the plate, I may provide the vertically-arranged strips I I' I'', which are carried over the top of the frame and then braided in, turned over or laced in between the horizontal strips, then over the bottom piece of the frame. Three of said strips are shown arranged at equal distances apart on the surface of the plate and support. In order to have each strip serve as conductors, their ends are arranged parallel with the ends of the horizontally-arranged strips to form the terminal.

In the drawings, Fig. 8, I have shown the body of the element formed by first arranging the separate horizontal strips in the manner described, and then braiding in and out or turning over or interlacing with these strips vertically-arranged strips, the arrangement being such that the whole surface or body is covered, and at the same time receptacles are formed on both surfaces of the element, but which do not communicate through the element, and in which any material active in the battery can be placed.

In the sectional view, Fig. 10, G represents the horizontally-arranged strips, and I the vertically-arranged strips. The strips I and G have their broad surfaces in contact, and the strips I, in passing over the strips G, form receptacles, which I have indicated as S, alternating in position on opposite sides of the plate.

In the drawings, Fig. 8, the vertically-arranged strips I are shown as arising from and having one of their ends at the right of the terminal, while the other ends of these same strips are carried along the bottom piece of the frame and upward along the support and to the left of the terminal. In this figure the vertically-arranged strips are shown to be slightly separated. I have so arranged them simply for the purpose of more clearly illustrating their position. I prefer in practice to have the strips directly in contact with each other, so as to cover the entire surface of the plate, and not to have any openings through the plate or element.

It will be noticed that all of the ends of the strips are contained within the trough-shaped opening K in the left-hand support, as shown at Fig. 9. I have indicated the different terminal ends in the drawings, Fig. 9, as of different widths simply for the pupose of more fully illustrating their position. The strips may be of any desired width, as before stated, and the horizontally and vertically arranged strips may be of different widths, if so desired. The object of carrying these strips within the cavity K, as described, is for the purpose of more perfectly insulating them from adjacent plates.

It will be noticed in Fig. 9 the flanges B' of the support project beyond the surface of the plate, so that when the element is arranged within a containing-cell the flanges of adjacent plates will have their surfaces in contact, and thus the body of the plates will be separated and insulated from each other.

The arrangement of the supporting-frame is such that the body of the plate is raised above the bottom of the containing-cell. I do this for the reason that any of the material which separates from the plates or elements will not then short-circuit the plate, and, further, for the purpose of allowing a more perfect circulation of the electrolytic liquid, within which the elements are immersed.

Upon the body or support formed in the manner described I may apply as a paste any material which will be active in the battery; or I may use an active material in a spongy condition, and force the particles of material between the convolutions of the support.

I wish it understood that I do not limit myself to the precise construction as shown and described, as many modifications may be made therein without departing from the intent of my invention.

By reason of the method employed of applying the supporting-strips over the insulating-frames, and the mechanical relations of the several parts, the expansions and contractions occurring in the plate during charging and discharging are provided for and the buckling and twisting of the plates entirely avoided.

I am aware that lengths or strips of wire have been braided, interlaced, or woven into a surrounding frame made of conducting material, and such I do not claim. All plates made in such a manner have the receptacles formed for the reception of the active material entirely through the body of the plate. This form I have found to be objectionable, as the expansion or contraction of the supporting-body allows the active material to fall out.

I claim as my invention—

1. A plate-like electrode for secondary batteries, comprising a non-conducting supporting-frame and a body or support for the active material, consisting of two or more strips of metal arranged loosely in said frame and free to expand in all directions.

2. A plate-like electrode for secondary batteries, comprising a non-conducting supporting-frame, a body or support for the active material, consisting of two or more separate strips of metal arranged loosely in said frame and free to expand in all directions, and the ends of said strips united to form a terminal.

3. A plate-like electrode for secondary batteries, comprising a non-conducting supporting-frame, a body or support for the material active in the battery, consisting of separate strips of metal arranged horizontally in said frame and free to expand and contract therein in all directions, and a terminal formed by uniting the ends of said strips.

4. An electrode for secondary batteries, comprising a non-conducting supporting-frame, a body or support for the material active in the battery, consisting of separate strips of metal arranged horizontally in said frame and free to move therein, and separate strips of metal arranged vertically in said frame and woven or braided over said horizontal strips, and a terminal formed by uniting all the ends of the separate strips.

5. An electrode for secondary batteries, comprising a non-conducting frame, a body or support for the active material arranged in said frame in separate and electrically-independent sections, and all of the sections united together through conductors to form a terminal, whereby all the sections will act collectively but independently of each other.

6. An electrode for secondary batteries, having its body or support formed in independent sections, and said sections provided with receptacles for the reception of the material active in the battery, whereby an injury or fault to one section will be limited to that section and not affect the action of the remaining sections of the electrode.

7. An electrode for secondary batteries, comprising a supporting-frame, a body or support consisting of ribbons of metal braided or woven together, their flat surfaces in contact, and arranged as independent sections within said frame and provided with receptacles wherein the active material or material to become active is packed, said receptacles on both surfaces but not through the electrode.

8. An electrode for secondary batteries, comprising a non-conducting supporting-frame, a metallic body or support for the material active in the battery arranged loosely in said frame, and the sides of the frame arranged to project beyond the surfaces of said supporting-body.

9. In a secondary battery, two or more elements or electrodes provided with non-conducting supporting-frames, the sides of which are wider than the top and bottom of said frames and project beyond the surfaces of the active portions of said electrodes, whereby while said electrodes are insulated from each other circulation of the electrolytic solution between the electrodes is not impeded.

10. An electrode for storage-battery, comprising a supporting-frame the sides of which are grooved and flanged and provided with rungs, in combination with strips of metal wound across said frame and over said rungs and the ends of said strips carried upward in one of the grooves to the top of the frame.

In testimony whereof I have hereunto subscribed my name this 30th day of March, A. D. 1885.

CHARLES SORLEY.

Witnesses:
 A. E. SEXTAN,
 GEO. H. BENJAMIN.